Figure 1:
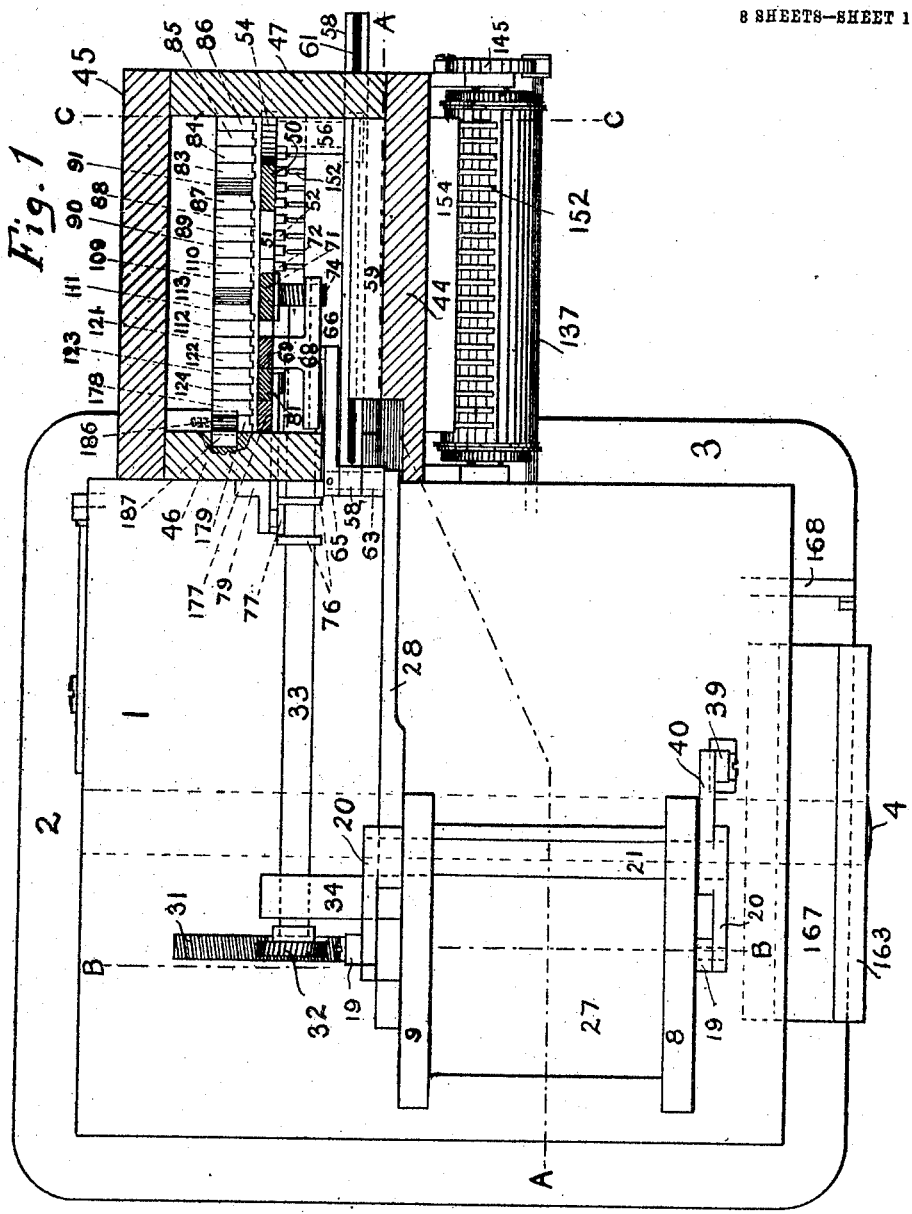

W. E. BRAND.
MATRIX SELECTING MECHANISM.
APPLICATION FILED OCT. 19, 1907.

1,086,506.

Patented Feb. 10, 1914.
8 SHEETS—SHEET 1.

Witnesses

Inventor
W. E. Brand
by F. Amos Johnson
Atty.

W. E. BRAND.
MATRIX SELECTING MECHANISM.
APPLICATION FILED OCT. 19, 1907.

1,086,506.

Patented Feb. 10, 1914.

8 SHEETS—SHEET 5.

Witnesses
M. Newman.
N. MacKinnon.

Inventor
W. E. Brand
by F. Amos Johnson
Atty.

W. E. BRAND.
MATRIX SELECTING MECHANISM.
APPLICATION FILED OCT. 19, 1907.
1,086,506.
Patented Feb. 10, 1914.
8 SHEETS—SHEET 6.
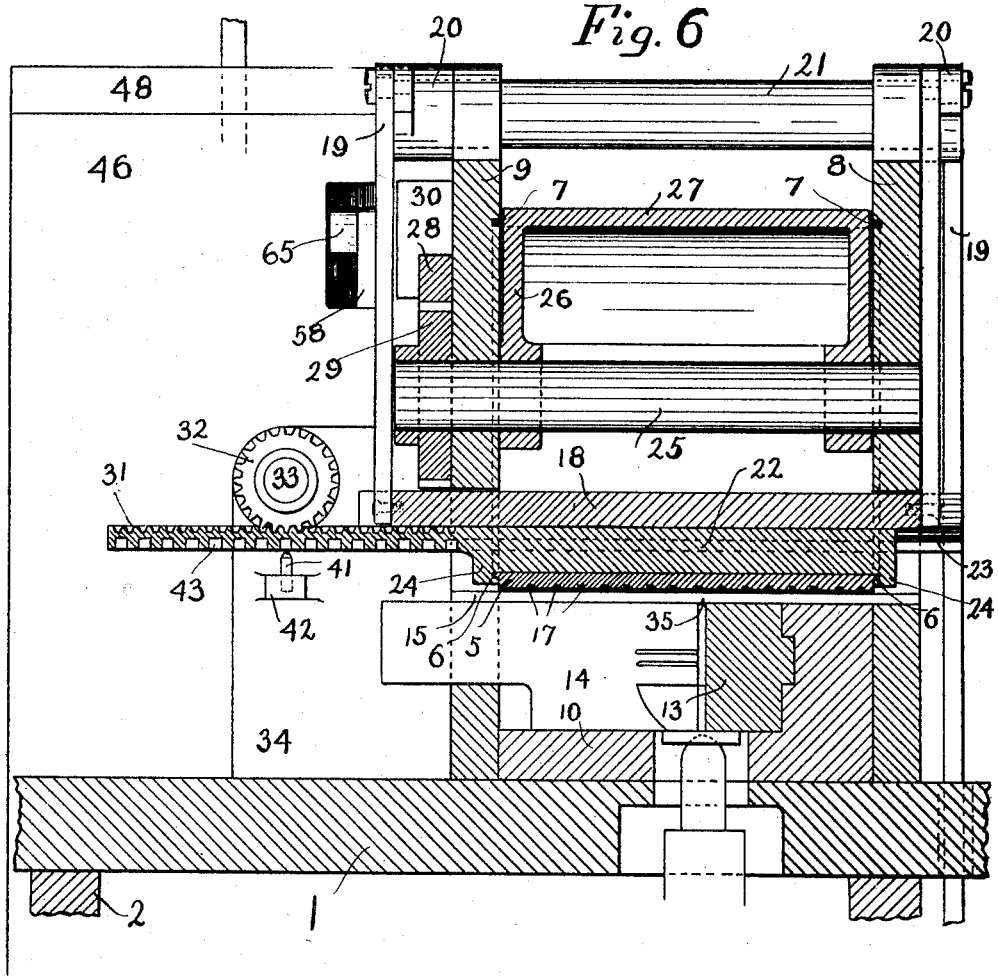
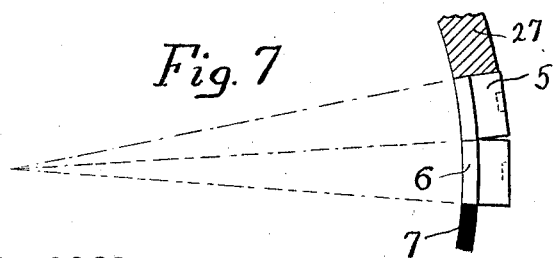
Witnesses
M. Newman
N. Mackinnon
Inventor
W. E. Brand
by F. Amos Johnson
atty.

W. E. BRAND.
MATRIX SELECTING MECHANISM.
APPLICATION FILED OCT. 19, 1907.
1,086,506.
Patented Feb. 10, 1914.
8 SHEETS—SHEET 7.
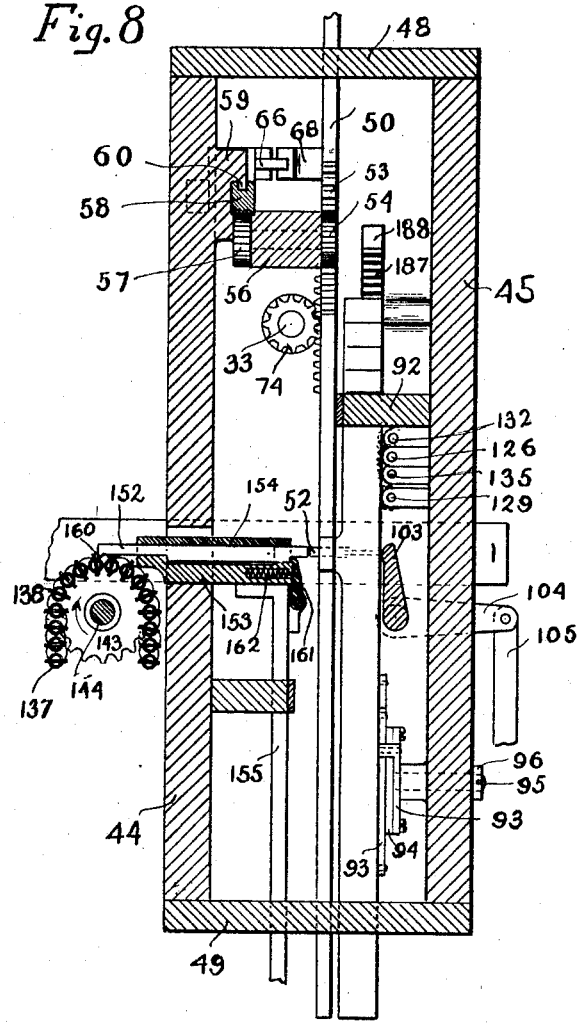
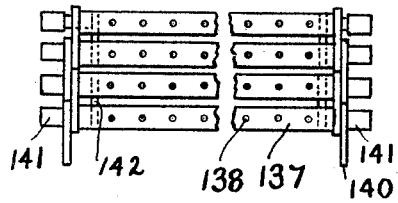
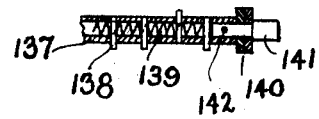
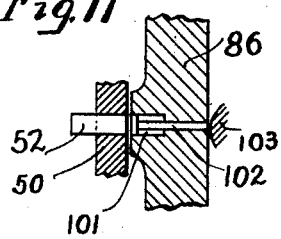
Witnesses
Jno. Newman.
N. Mackinnon.
Inventor
W. E. Brand
by F. Amos Johnson
Att'y.

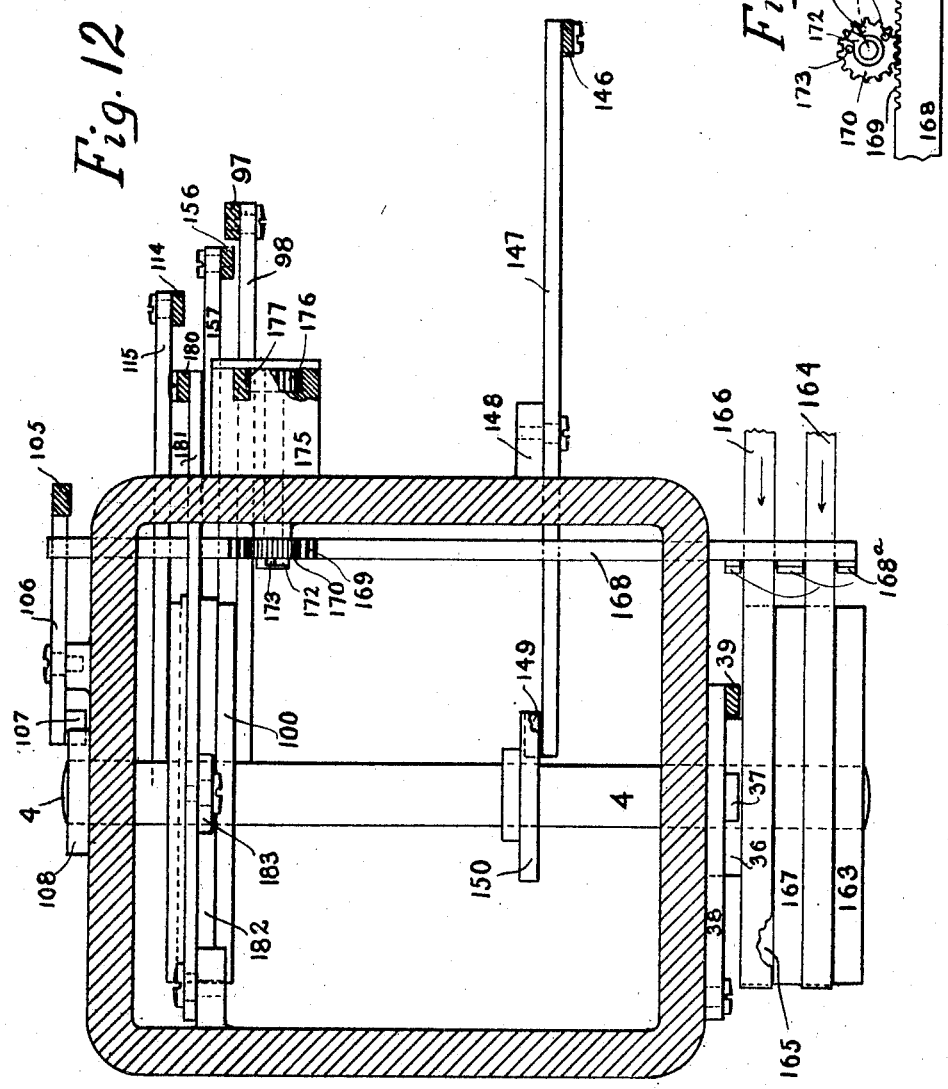

UNITED STATES PATENT OFFICE.

WILLIAM E. BRAND, OF BOSTON, MASSACHUSETTS, ASSIGNOR TO VITE-A-TYPE COMPANY, OF PORTLAND, MAINE, A CORPORATION OF MAINE.

MATRIX-SELECTING MECHANISM.

1,086,506.

Specification of Letters Patent. Patented Feb. 10, 1914.

Application filed October 19, 1907. Serial No. 398,205.

*To all whom it may concern:*

Be it known that I, WILLIAM E. BRAND, a citizen of the United States, residing at Boston, in the county of Suffolk and State of Massachusetts, have invented certain new and useful Improvements in Matrix-Selecting Mechanism; and I do hereby declare the following to be a full, clear, and exact description of the same.

My invention relates to that class of typographic machines in which the lines are preliminarily represented on a controller which afterward comes into effect to secure the selection of the matrices, type or dies in the proper order for composition.

It is designed especially to enable the use of a larger number of characters in the font of matrices, type or dies, than has been possible heretofore and at the same time to reduce the width of the controller—at least relative to the number of characters; also to provide a matrix-placing mechanism in which the variably moving parts are positive at all times.

With a rectangular form of matrix case it has not been found practicable to provide for more than 225 characters (15 rows with 15 matrices in each row.) In the U. S. Letters Patent No. 862,800, granted to me Aug. 6, 1907, I showed a form of matrix case by means of which I have been able to increase this number somewhat. In that machine the matrix case had a circular sliding movement to select a matrix bar and the whole case was moved bodily to select the particular matrix of that bar. In my improved machine I use the same form of circular sliding movement to select the bar, but instead of moving the whole case, I move only the selected bar, in order to secure the selection of the particular matrix wanted. Furthermore I have provided a variable speed device, under the action of the controller, whereby, when the outlying bars or those requiring long movements are to be selected and the characters on the selected bar requiring long movements are wanted, the speed of the machine is reduced. With this form of matrix case and by using a variable speed device I am able to put in from six to eight hundred characters or even more.

In order that the controller may not be unduly wide, I have provided a compound selecting device, by means of which a small number of actuating pins in the controller will secure the selection of a large number of characters.

Other improvements will be described in the specification and pointed out in the claims.

Figure 2:
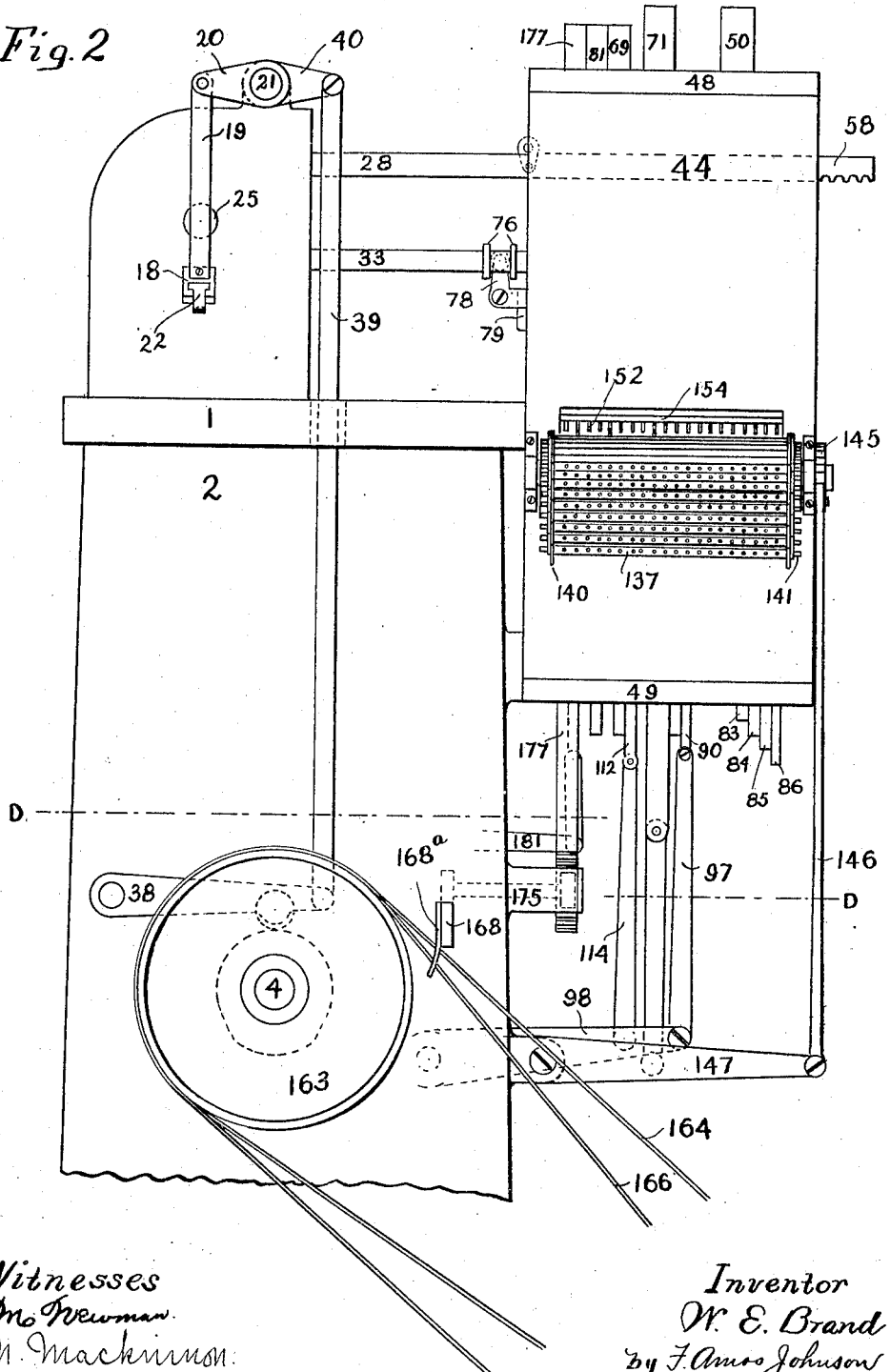
Figure 3:
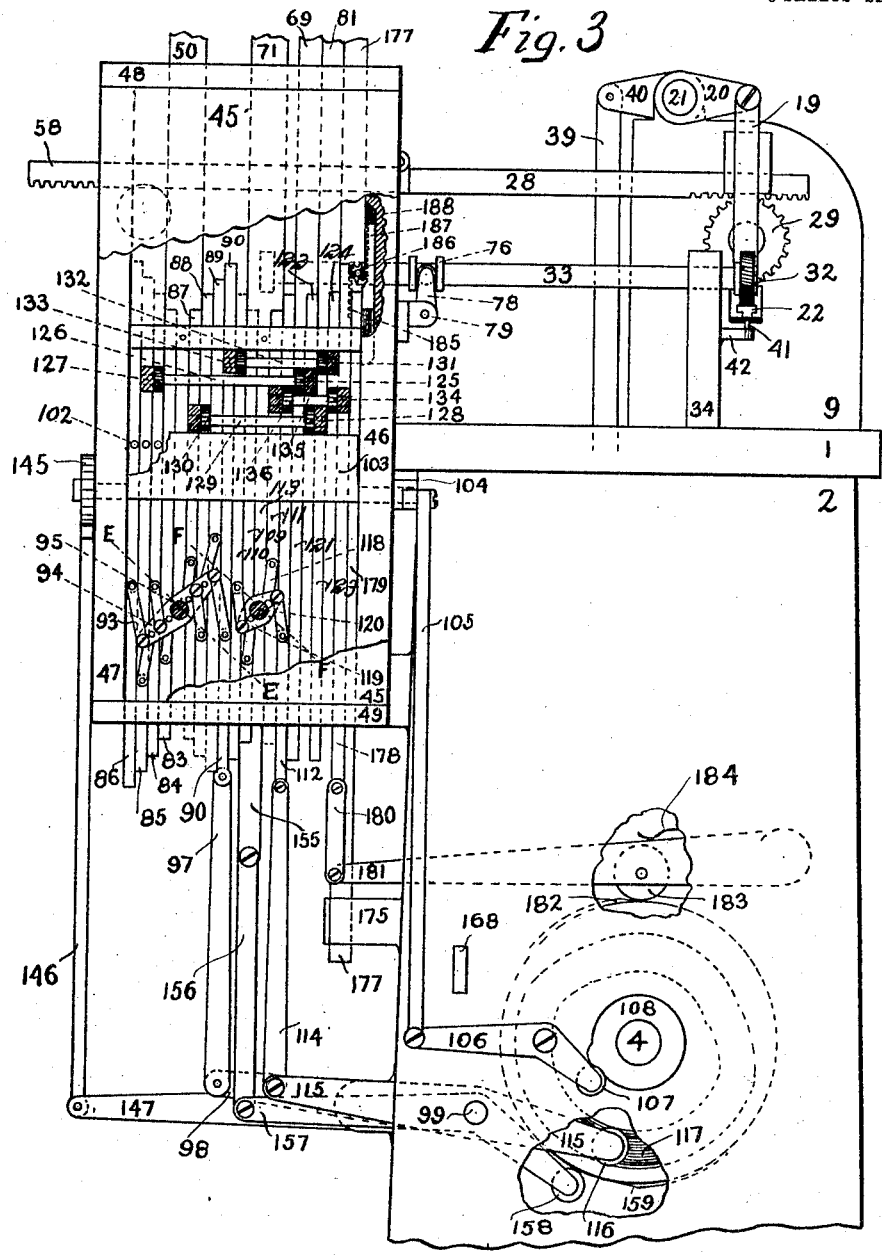
Figure 4:
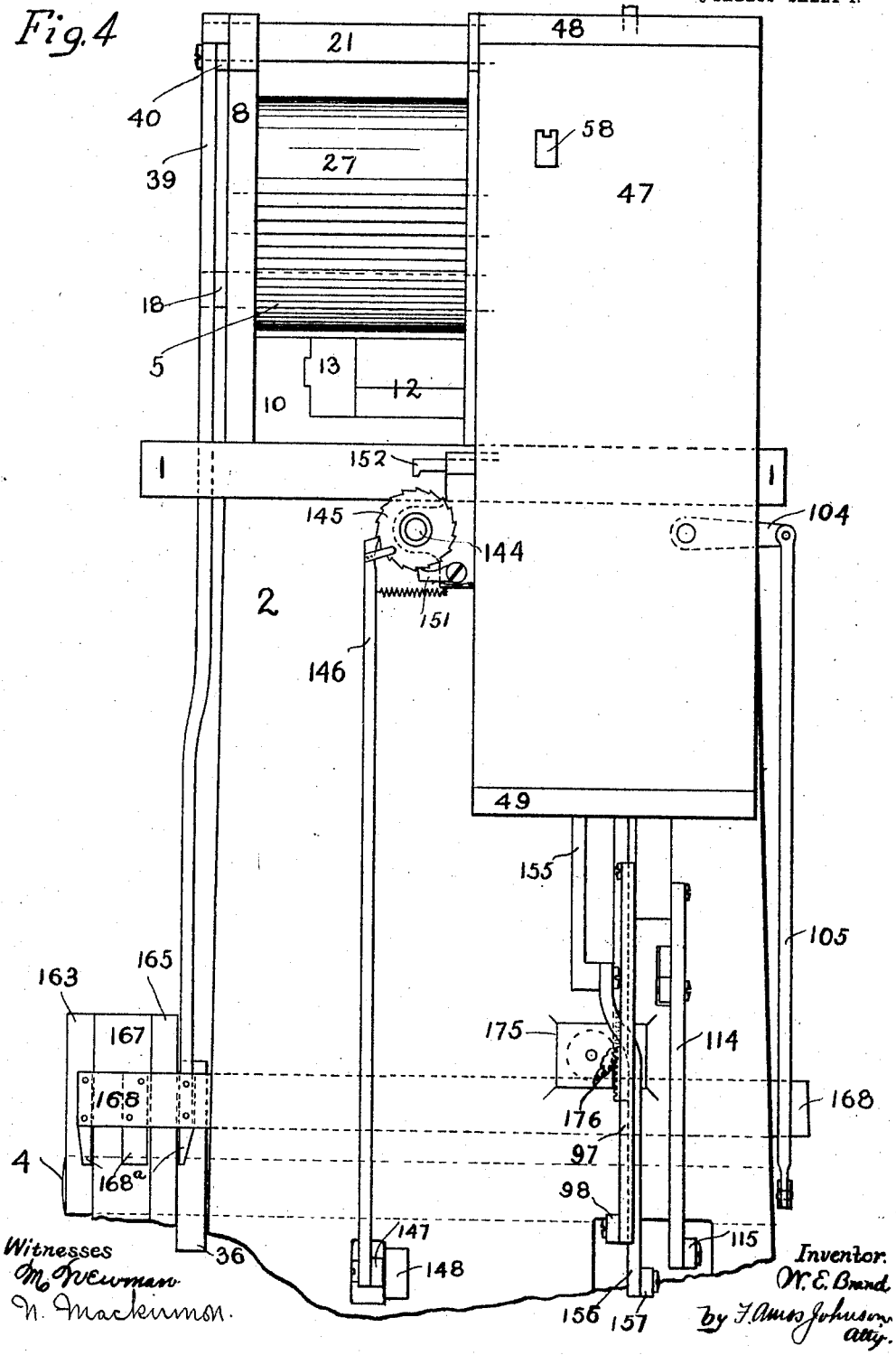
Figure 5:
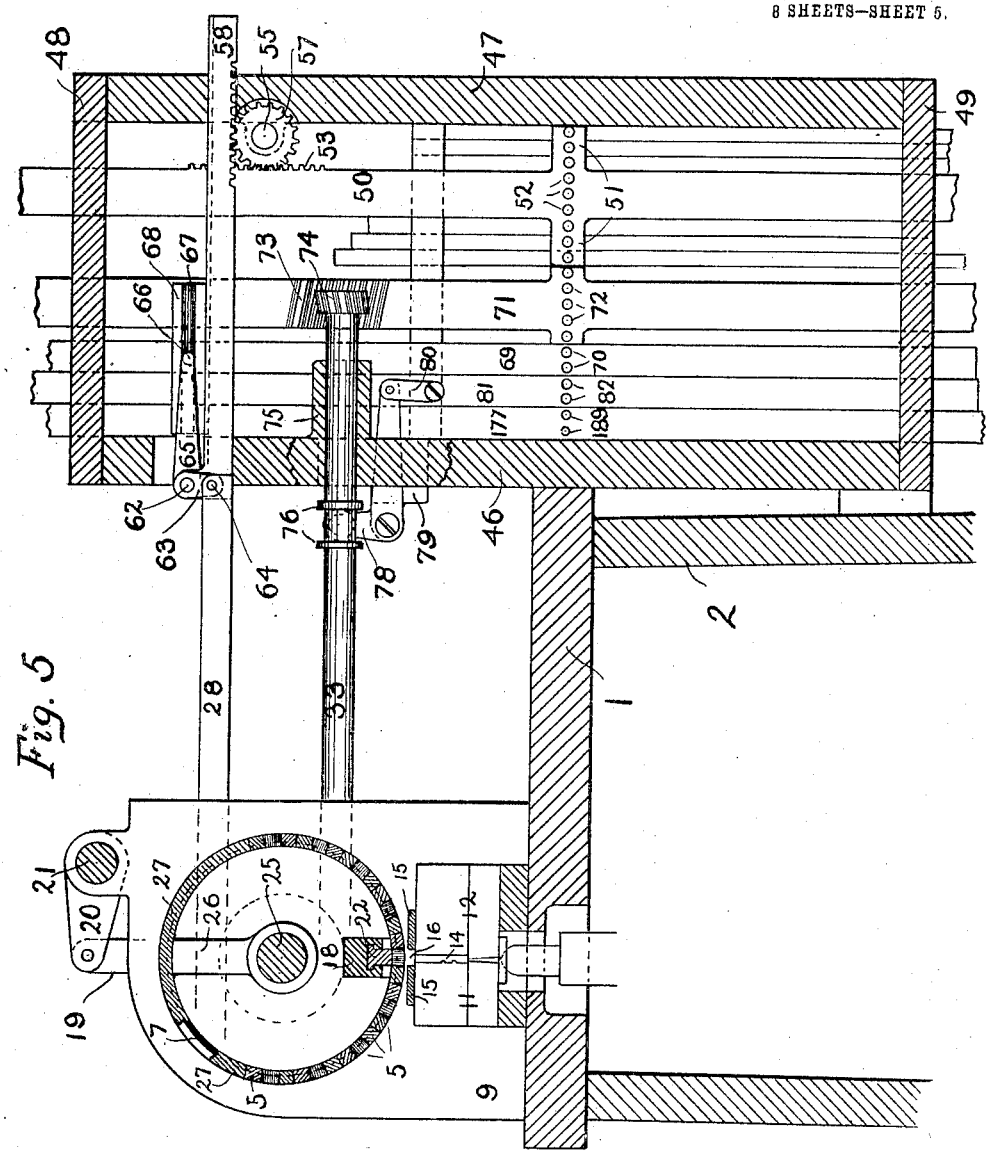

In the following description reference is made to the accompanying drawings in which:

Figure 1 is a plan—the top plate of the matrix-placing mechanism being removed. Fig. 2 is a front elevation. Fig. 3 is a rear elevation—a portion of the column and housing for the matrix-placing mechanism being broken away. Fig. 4 is a right elevation. Fig. 5 is a front sectional elevation, about on line A—A of Fig. 1. Fig. 6 is a left elevation about on line B—B of Fig. 1. Fig. 7 is an enlarged detail showing the construction of the matrix bars. Fig. 8 is a right sectional elevation about on line C—C of Fig. 1. Fig. 9 is a detail of the controller. Fig. 10 is a sectional view of one of the controller bars. Fig. 11 is a detail section showing one of the setting pins. Fig. 12 is a sectional plan through the column about on line D—D of Fig. 1. Fig. 13 is a detail showing a portion of the speed changing device.

My improvements were designed especially for use in connection with a type-casting and composing machine such as is shown and described in my former patent, above referred to. I have illustrated and will describe only so much of a machine as will be necessary for a full understanding of my improvements. I have, therefore, not deemed it necessary to show a key-board, or any means for setting the actuating pins of the controller. The unit registering and justifying mechanism is also omitted; also the means for setting the body piece of the mold, as well as the melting pot and metal injecting mechanism and means for removing the type from the mold and assembling the same in a galley.

*Detail description.*—The matrix-case is mounted above a plate 1. This plate is supported on top of a hollow, substantially square column 2, which has a suitable base 3. The matrix-placing mechanism is located at the right of the column. A shaft 4 mounted in the front and rear walls of the column, carries the cams from which the various automatic movements necessary to drive the various parts are generated. The matrix-case is composed of matrix bars 5 (see Figs. 5 and 6.) These bars have flanges or ears 6, at their front and rear ends, by means of which they are supported in annular grooves 7, in front and rear plates 8 and 9 respectively. Underneath the case, mounted on a suitable mold base 10, is located the mold, composed of left and right cheek pieces 11 and 12 respectively; cover slide 13; body piece 14. These being the names in common use among type founders the function and use of the parts are well understood. On the top of the mold there are two alining-plates 15 which form an alining slot 16 into which one of the matrix bars 5 may be impressed in order to seat one of the matrices 17 on the mold.

Extending from front to rear, between the plates 8 and 9, there is a vertically reciprocating impression bar 18, connected by a pair of links 19, to a pair of arms 20, which are on a shaft 21. This impression bar 18 carries a T-shaped rack 22 mounted in a slot 23 of the said bar. This rack has a pair of downwardly projecting hooks 24 which, when the bar is in its normal or central position, exactly aline with the annular grooves 7. These hooks are adapted to support the matrix bar which is directly over the alining slot.

The matrix case is given a rotating movement by rocking a shaft 25. This shaft is mounted in the front and rear plates and has a pair of arms 26, which carry a semi-cylindrical plate 27. This plate comes against the outside matrix bars and, together with the bars, forms virtually a complete cylinder. It will be noticed that the matrix case is in the form of a sector of a regular right prism, whose axis is the center of the shaft 25 and that the twenty seven bars shown occupy an arc of a little over one hundred and eighty degrees—requiring a movement of a little over ninety degrees to bring the most distant matrix bars in position over the alining slot 16.

The matrix bars are slightly concave on their inner surface—being made to the radius of the matrix case—and a portion of the bars (that opposite the flanges) are made radial, as shown in Fig. 7. This arrangement permits one bar moving another without danger or tendency of cramping.

The shaft 25 is rocked in either direction by means of a reciprocating rack 28, which is in mesh with a gear 29. This gear is on the rear end of the shaft 25 and the rack is held in position by a keeper 30, secured to the back side of rear plate 9. Each of the matrix bars 5 contains fifteen matrices 17.

After a matrix bar has been selected and brought into position over the alining slot 16 it is moved either forward or rearward in order to bring a particular matrix on the bar to the impression point, by reciprocating the rack 22. This rack is provided with teeth 31 and is driven by a gear 32 which is mounted on the left end of a shaft 33; said shaft having a bearing near its left hand end in a plate 34. This rack and gear are cut spirally for a purpose which will appear later.

After a matrix has been selected and brought to the impression point 35, it is seated in the alining slot on the mold by rocking the impression shaft 21. This is accomplished from a cam 36 located on the shaft 4 just outside the column 2, through the following connections: roll 37; lever 38; connecting rod 39; impression arm 40. This movement carries the rack teeth 31 of the rack 22 out of mesh with its gear 32 or partly so and as the rack 22 is moved downward a centering pin 41, mounted on a bracket 42, enters one of a series of holes 43 in the rack 22. The centering pin locks the rack 22 so as to secure the proper "position" for the selected matrix.

*Matrix-selecting mechanism.*—It is evident from the foregoing description that, by reciprocating the rack 28 and by revolving the shaft 33, any desired matrix in the case may be brought to the impression point 35. These movements are accomplished by mechanism located at the right of the machine and mounted in a housing composed of front and rear plates 44 and 45; left and right plates 46 and 47; top and bottom plates 48 and 49.

There is a vertical slide 50 which has, near its center, a pair of arms 51, in which there is a horizontal row of nine selecting pins 52. The slide 50 has rack teeth 53 which are in mesh with a gear 54 which is on a short shaft 55; said shaft having a bearing in a boss 56 on the inner side of right hand plate 47. On the front end of this shaft is a gear 57 which is in mesh with a rack 58—said rack being mounted to slide in a slot cut in a projection 59 which is on the rear side of front plate 44—being held in position by a tongue 60 which enters a groove 61 in said rack. The left hand end of the rack 58 has an upwardly extending portion which carries a short shaft 62. On the front end of this shaft is a vertical arm 63 which is connected by a pin 64 to the rack 28. The rear end of the shaft 62 has a horizontal arm 65, the right hand end of which has a rearwardly projecting pin 66 which enters a slot 67 in a cross-head 68; said cross-head being mounted to a vertically sliding bar 69. This bar has two selecting pins 70 quite similar to pins 52. From this construction it is evident that as the slide 50 is moved upward or downward the rack 58 will be moved to the right or left and the rack 28 will be carried with it—the pin moving in the horizontal slot 67.

The slide 50 is actuated by series of placer slides which will presently be described. The construction is such that if the center pin 52 is driven no motion will be imparted to the slide 50. If pins to the right of the center are driven the slide 50 will be carried upward varying distances according to the pin driven. If pins to the left of the center are driven the slide will be carried downward varying distances according to the pin driven. Nine positions of the slide 50 are thus secured which will select, through the parts pointed out, nine of the twenty seven matrix bars 5—that is every third bar (represented in the drawings Fig. 5 by radial shading.)

By moving the slide 69 a supplemental movement is imparted to the rack 28, increasing or decreasing it, according as the movement of the bar 69 is upward or downward; so that instead of selecting one of the nine bars referred to, it will select one of the adjacent bars. From this construction it is evident that the nine positions of the slide 50, in combination with two movements of the slide 69, are capable of selecting any one of the twenty seven matrix bars.

At the left of the slide 50 and mounted in the same plates is a similar slide 71, having five selecting pins 72. This slide has a spiral rack 73 in mesh with a gear 74 which gear is located on the right hand end of the shaft 33—said shaft having its right hand bearing in a boss 75 extending to the right from the left hand plate 46. The shaft 33 has, just outside the plate 46, a pair of collars 76. These collars inclose a roll 77 which is carried by an upwardly extending arm of a bell-crank 78 which bell-crank is mounted on a hanger 79 on the left hand side plate 46. The horizontal arm 78 of the bell-crank is connected by a link 80 to a vertical slide 81. This slide is mounted alongside of and is similar to slide 69 and has two selecting pins 82. As the slide 71 is carried upward or downward (which movement is effected in a manner similar to that of slide 50 to be explained) the shaft 33 is turned and, through the parts already pointed out, the rack 22 will take any one of five positions. This will secure the selection of the central matrix of the bar and every third matrix therefrom.

The rack and gear 73 and 74 are left hand spirals, while the rack and gear 31 and 32 are right hand spirals. By moving the slide 81 upward or downward the shaft 33 is given a movement lengthwise in its bearings and a supplemental movement obtained thereby which increases or decreases the normal movement of the rack 22. This secures the selection of the adjacent matrices and it is evident that by means of the five positions of the rack 71 and two movements of the slide 81, any one of the 15 matrices of a matrix bar may be selected and brought to the impression point.

In thus compounding the movements of the selecting devices, as above described, by the use of supplemental feed movements, I am able, by eight variable movements of the slide 50; four movements of the slide 71; and two each of the slides 69 and 81—making a total of sixteen movements—to secure the selection of all of the four hundred and five matrices of the case. By two additional pins 72 in the slide 71, matrix bars containing twenty five matrices might be used and the total number of matrices increased to six hundred seventy five. By the use of two additional pins 52 in the slide 50 eighteen extra matrix bars could be used—likewise increasing the number of matrices. By using two extra pins 52 and two extra pins 72 at the same time, the number of matrices in the case could be increased to one thousand one hundred and twenty-five.

Each selecting pin requires a single representation or actuating pin in the controller as will appear later. By the above arrangement I am, therefore, able to use a narrow controller and yet select any one of a large number of matrices of the case.

*Placer slides.*—At the rear of the slide 50 is a series of placer slides 83, 84, 85, 86, 87, 88, 89, 90 separated by a stationary center piece 91. These slides are mounted for vertical movements in the base plate 49 and in a slotted piece 92. Each slide is connected by a link 93 to a lever 94. This lever is pivoted to a shaft 95 which has a bearing in the rear plate 45 and is held in position by a collar 96. The left hand placer slide 90, of this set, extends down through the base plate 49 and is connected by a link 97 to a horizontal lever 98 which is fulcrumed on a rod 99 and has a roll which enters a slot in the front face of a cam-wheel 100. (This roll and cam slot are not shown but they are similar to a roll 116 and cam slot 117 which are shown and described farther on.) As the shaft 4 is turned the lever 94 will alternately take the position shown in Fig. 3 and the position shown by the lines E—E. That is, the slides 83—86 will be moved up from one to four steps respectively, and the slides 87—90 will be moved down from one to four steps respectively. The placer slides 83—90 are provided with holes or sockets 101 into which the selecting pins 52 may be driven, as will be pointed out. These sockets 101 are provided with idle pins 102 and as the selecting pins 52 are driven into their sockets the pins 102 are forced rearward. They are driven forward to return the selecting pins to normal position by a rocking blade 103, which is mounted between the left and right plates 46 and 47. This blade is actuated by an arm 104 which is connected by rod 105 to a lever 106. This lever has a roll 107, in contact with a cam 108 which is on the rear end of shaft 4—the cam-lever being mounted on the outside of the column. At the rear of the slide 71 there are four placer slides 109, 110, 111, 112 with a central piece 113. The left hand slide 112 extends down through the base plate 49 and is connected by a link 114 to a cam-lever 115. This lever is fulcrumed on the rod 99 and has a roll 116 which enters a cam slot 117 formed in the rear face of the cam wheel 100. The placer slides 109—112 are connected by links 118 to a lever 119. This lever is pivoted to a shaft 120 in the rear plate 45—similar to the lever 94 and shaft 95. As the shaft 4 is revolved the lever 119 will alternately take the position shown in Fig. 3 and the position shown by dotted line F—F, causing slides 109 and 110 to move upward one and two steps respectively and the placer slides 111 and 112 to be drawn down one and two steps respectively.

At the left of the placer slides 112 there are two slides 121 and 122 for controlling the movement of the slide 69 and to the left of these there are two slides 123 and 124 for controlling the movement of the slide 81. (All the placer slides have sockets 101 and returning pins 102 the same as shown for the slide 83 in Fig. 11.) The reciprocating movement necessary for the slides 121, 122, and 123, 124 might be generated by levers similar to 94 and 119, but I prefer to connect across by shafts and pinions as follows: The placer slide 121 is connected by pinion 125, shaft 126 pinion 127 to the placer slide 84. The placer slide 122 is connected by pinion 128, shaft 129 pinion 130 to slide 88. The placer slide 123 is connected by pinion 131 shaft 132 pinion 133 to slide 110 and the placer slide 124 is connected by pinion 134, shaft 135, pinion 136 to slide 112. From this construction it is evident that as the lever 94 is rocked the slides 121 and 122 will be reciprocated and as the lever 119 is rocked the slides 123 and 124 will be reciprocated.

*Controller.*—This consists of a series of parallel tubes 137, each tube carrying eighteen actuating pins 138 which are held in the position in which they are set by a friction spring 139. The tubes are pivoted together by links 140 which are loose on pins 141 extending from the ends of the tubes. The tubes are fastened together in pairs by pins 142. The controller is supported by a pair of sprocket wheels 143 which are mounted on a shaft 144 and it is fed, in the direction indicated by the arrow in Fig. 8, by a ratchet wheel 145 which is mounted on the outer end of the shaft 144. Motion is imparted to the ratchet wheel by a pawl 146 which is attached to a lever 147 which lever is fulcrumed to a projection 148 from the column. The lever has, on its left end, a roll 149 in contact with a cam 150, by means of which it is reciprocated. A retaining pawl 151 is provided for the ratchet 145. The pins of the controller may be set up by hand or preferably they would be set by such a selecting device as is shown and described in my previous patent already referred to.

The actuating pins 138 of the controller are caused to drive the selecting pins into their respective placer slides, by means of intermediate horizontal slides 152. These slides are mounted on a vertically moving support 153 and are held in position by a cap plate 154. The frame 153 is mounted on a vertically sliding stem 155 and is connected by a link 156 to a lever 157 which lever is fulcrumed on the rod 99 and has a roll 158 adapted to be operated on by a cam surface 159 on the cam wheel 100.

The rear ends of the slides 152 are in front of and in close proximity to the selecting pins. The forward ends of the slides have downward projections 160 which, when the slides are in their lowest position, are in the paths of the actuating pins which have been set in the controller and as the shaft 144 is revolved, corresponding slides 152 are carried to the rear; thereby driving corresponding selecting pins into the placer slides. On the upward movement of the frame 153 the slides 152 will be disengaged from the actuating pins of the controller; at which time rocking blade 161, actuated by a spring 162, will return the slides to their forward or normal position.

*Variable speed device.*—When matrices are to be selected which require but a short movement in order to reach the impression point I arrange to run the machine at its highest possible speed. When characters requiring a long movement are to be selected I arrange to slow down the speed of the machine during the time these characters are being used and to restore it to its maximum speed immediately thereafter. By this means I not only greatly increase the output of the machine, but I save an immense amount of wear and tear due to long movements of the die or matrix case when run at high speed. I do this by putting actuating pins in the controller which go into effect at the proper time to carry the speed as may be required. Any of the well known variable speed devices may be resorted to and several different speeds may be obtained. For the purpose of illustration I have shown a variable belt driven mechanism and means for obtaining two different speeds.

On the front end of the main shaft 4 there is a fixed pulley 163 adapted to be driven by a belt 164 at a comparatively slow rate of speed. A little farther back is another fixed pulley 165 adapted to be driven by a belt 166 at a higher or the maximum speed at which the machine can be run. Between these two tight or fixed pulleys there is a loose pulley 167. I have provided a shipper-bar 168, mounted in the front and rear walls of the column, which has fingers 168ª engaging the belts 164 and 166. The shipper-bar has rack teeth 169 cut on its upper surface which engage a gear 170, loosely mounted on a shaft 171. This shaft has, on its left hand end, an arm 172 which is adapted to strike against pins 173 and 174 which project from the gear 170. The shaft 171 extends to the right through the side of the column which has a projection or boss 175 at this point, and carries on its outer end a gear 176 which is in mesh with a vertically sliding rack 177. By forcing this vertical rack down, the shipper-bar 168 will be shifted so that the belt 164 will be on the tight pulley 163 and the belt 166 will be carried on to the loose pulley 167 and the speed of the machine reduced thereby. As the slide 177 is returned to its normal position the arm 172 will be brought back to its position shown in Fig. 13 and at that time the pin 174 will be in the position shown dotted at 174' close up against said arm. By forcing the slide 177 upward a reverse movement of the shipper-bar will be effected and the belts shifted back to the position shown in Fig. 12. The downward and upward movement of the bar 177 will be effected by means of a pair of slides 178 and 179 which are similar to the placer slides. The slide 178 is connected by means of a link 180 to a lever 181. This lever has a roll 183 and is actuated by a cam surface 182 on the cam wheel 100. A spring 184 serves to keep the roll 183 against the cam. A reversing gear is interposed between the slides 178 and 179 so that they always move in opposite directions, as follows: The upper end of the slide 178 has rack teeth 185 and the slide 179 has a short rack 187 which slides in a slot 188 in the left side piece 46. Between the two racks is a reversing gear 186 so that, as the slide 178 is forced upward the slide 179 is driven downward. The slide 177 is provided with pins 189 similar to the selecting pins 52 etc. When any character is to be selected which requires a long movement in order to bring it to the impression point the proper actuating pins are set in one of the bars of the controller and in the bar just ahead of it the left hand pin is also driven. This pin causes one of the slides 152 to drive the left hand selecting pin 189 of the slide 177, causing it to take a downward movement with the placer slide 179 and through the connections pointed out, to shift the belts and reduce the speed of the machine; so that when the next matrix character—the one which requires a long movement—is selected the machine will be running slower. The next adjacent pin of the controller (second from the left) is used to secure a reverse movement of the shipper-bar so as to secure the maximum speed.

This variable speed device is particularly valuable in type-casting and composing machines. Small type—those containing little metal—cool very much quicker than large sizes. If, therefore, the machine were run at the maximum speed possible for ordinary sizes of a font, when a wide character was reached—such as "Æ" "Œ", the leader "...." or even the cap "M" and "W"—there would not be sufficient time for the metal to cool. By slowing down the movements for these wide characters, which may be done by the variable speed mechanism I have described, I am able to greatly increase the output of the machine. For this purpose the wide characters need not be located in outlying sections of the case, but may be put in any convenient or desired location.

What I claim is:

1. In a power-driven matrix-selecting mechanism, adapted to secure the selection of matrices in the order of composition, means for securing a slow or retarded movement when matrices of "thick" or extended characters are being selected and means for securing accelerated or increased speed when matrices of "thin" or condensed characters are being selected.

2. In a power-driven matrix-selecting mechanism, adapted to secure the selection of matrices in the order of composition, the combination with means for securing a normal speed when matrices of an average size are being selected, of mechanism for automatically securing a slower movement when matrices for larger or more extended characters are being selected and means for restoring the speed to normal.

3. A power-driven, matrix-placing mechanism provided with means for varying the speed thereof, having a controller therefor said controller being provided with matrix-selecting representations and representations adapted to vary the speed of the matrix-placing mechanism when certain characters of the case are to be selected.

4. In a typographic machine, the combination with a matrix case of a power-driven matrix-selecting mechanism therefor provided with means for varying the speed thereof, said mechanism operating under the action of a controller, said controller being provided with matrix-selecting representations and representations adapted to vary the speed of the matrix-placing mechanism when certain characters of the case are to be selected.

5. In a typographic machine, the combination with a plurality of matrices mounted to move bodily of a matrix-selecting mechanism and means for varying the speed of said matrix-selecting mechanism when certain matrices are to be selected.

6. In a typographic machine, the combination with a matrix case requiring movements of varying lengths for the selection of different characters, of a matrix-selecting mechanism adapted to secure the selection of any of the matrices of the case, means for securing a maximum speed of matrix-placing mechanism when matrices requiring short travel are to be selected and means for securing a slower movement when matrices requiring a greater travel are to be selected.

7. In a typographic machine, a matrix case having matrices arranged in rows in two directions around a selecting or impression point, in combination with means for securing slower movements for matrices which have a long distance to travel, and means for accelerating the movements when matrices requiring but a short distance to travel are being selected.

8. A power-driven matrix-placing mechanism operating at a normal speed under the action of controller, said controller being provided with movable actuating pins some of which may be set to secure the selection of matrices, others of which may be set to reduce the speed of the matrix-selecting mechanism below the normal and still others of which may be set to restore the matrix-placing mechanism to normal speed.

9. In a typographic machine a matrix case comprising parallel matrix bars each bar containing a plurality of matrices, said bars being contiguously disposed—whereby each bar is caused to move the next adjacent bar, means for moving said case in one direction to select one of the bars and means for moving that bar only in another direction to secure a particular matrix on that bar.

10. In a typographic machine, the combination of the following elements, to-wit: a matrix case comprising parallel matrix bars, each bar having a plurality of matrices; means for moving the case in one direction to select a matrix bar; means for moving the selected bar only in another direction to select a matrix, a type mold, a pair of alining plates on the front of said mold adapted to receive and aline a matrix bar and a nipple and apron seated against the opposite side of said mold.

11. In a typographic machine, the combination of the following elements, to-wit: a matrix case comprising parallel matrix bars arranged in the form of a sector of a regular, right prism; means for rotating the case on the axis of the prism to select a bar; means for moving the selected bar only, parallel with the axis of the prism to select a matrix; a long alining slot capable of receiving a bar and means for moving the selected bar radially to seat the selected matrix in said slot.

12. In a typographic machine, the combination of the following elements, to-wit: a matrix case having parallel matrix bars; a reciprocating piece adapted to receive a single matrix bar, to support said bar at both ends and to move it out of the case.

13. In a typographic machine, the combination of the following elements, to-wit: a matrix case having parallel matrix bars; means for moving the case to select a bar; an impression plunger; a movable slide mounted therein, said slide being adapted to receive the selected matrix bar; means for reciprocating said slide to move the selected matrix bar independent of the other bars of the case in order to select a matrix; a mold and means for moving the impression bar and its slide to seat the selected matrix on the mold.

14. A matrix case composed of parallel matrix bars a pair of oppositely disposed end supports therefor, said bars having ears 6, adapted to slide in annular grooves 7 in said end supports, by means of which the bars are supported and held in proper radial position.

15. A matrix case composed of parallel matrix bars, a pair of oppositely disposed end supports therefor, said bars being loosely assembled and supported by ears in a pair of annular grooves cut in the end supports, the said bars having portions of their sides cut radially to afford a suitable bearing or contact between the bars.

16. In a typographic machine, the combination of the following elements, to-wit: a matrix case having parallel matrix bars; a type mold; an impression bar; a slide mounted in said bar and adapted to receive a matrix bar and to move it to select a matrix character, said slide being provided with a series of suitable holes; means for moving the impression bar and slide to seat the selected matrix on the mold and a centering pin, adapted to coöperate with one of the holes of the slide to accurately position the matrix character on the mold.

17. In a typographic machine, a matrix case having rows of matrices, in combination with a compound, double matrix-selecting mechanism, either part of which is adapted to select one of a plurality of rows of matrices and the other part of which is adapted to vary the throw of the first part—increasing or decreasing the movement—to secure the selection of another row of matrices.

18. In a typographic machine, a matrix case, having rows of matrices, in combination with a compound, double matrix-selecting mechanism, the movements of both parts of which are regulated by a controller, either part of which is adapted to select one of a plurality of rows of matrices and the other part of which is adapted to vary the throw of the first part—increasing or decreasing the movement—to secure the selection of another row of matrices.

19. In a machine of the class described, the combination with a matrix case, of primary matrix-selecting devices and connections therefrom to secure the selection of certain characters of the case, supplemental feed devices interposed in said connections and adapted to increase or decrease their throw to secure the selection of other characters of the case and means for operating said supplemental devices simultaneously with primary matrix selecting devices.

20. In a typographic machine the combination with a matrix case, of a matrix selecting device, a connection therefrom to the matrix case comprising a shaft having a spiral gear, means for revolving the shaft to impart a normal movement to the case and means for moving the shaft longitudinally to secure an increased or decreased movement for a matrix character.

21. In a matrix-selecting mechanism, a supplemental feed device consisting of a shaft having a spiral gear, a spiral rack in mesh therewith and means for moving said shaft longitudinally to secure variable movements as desired.

22. In a matrix-selecting mechanism, the combination with the shaft 33, having spiral gears 32 and 74, of the spiral racks 31 and 73 respectively in mesh with said gears, and means for moving said shaft endwise in its bearings to secure a movement of the rack 31 independent of the rack 73.

23. In a matrix-placing mechanism, the combination with a plurality of adjacent slides, of a rocking lever and intermediate connections between the slides and the lever for reciprocating the slides to secure uniformly stepped movements—each of the slides being independently connected to and adapted to receive its movement from the rocking lever.

24. In a matrix-placing mechanism, the combination with a plurality of parallel slides, of a lever and means for rocking the same, of a corresponding plurality of connecting links from the lever to the slides which are adapted to secure uniformly stepped positions of the slides as the said lever is rocked.

25. In a matrix-placing mechanism the combination with a series of primary placer slides of second or supplemental series of placer slides and means for actuating each slide of the latter from one of the slides of the former.

26. In a matrix-selecting mechanism, the combination of the following elements, to-wit: a rocking lever; a plurality or series of parallel placer slides; intermediate connecting links between the lever and the slides, each slide having its own connecting link and said links being pivoted at uniformly varying distances each side of the fulcrum of the lever—whereby certain of the slides may be moved to uniformly varying positions in one direction and certain other slides will be simultaneously moved to uniformly stepped positions in the opposite direction.

27. In a machine of the class described the combination with a matrix-placing mechanism having a series of selecting pins, of a controller having actuating pins, intermediate sliding pieces adapted to be moved by the actuating pins of the matrix-placing mechanism; means for moving the slides into the paths of the actuating pins of the controller to set the selecting pins; means for raising the slides out of the paths of the actuating pins and a spring seated blade for restoring the slides to normal or unset positions.

28. The combination of a plurality of independently movable matrix carriers collectively movable to bring a desired carrier into operative relation to a single molding point, and means for moving such selected carrier independently of the remainder in either direction from normal mid position to bring a desired matrix thereon into operative relation to said molding point.

In testimony whereof I affix my signature in presence of two witnesses.

WILLIAM E. BRAND.

Witnesses:
 CLARENCE V. MOORE,
 FLAVILL G. KYLE.